(12) United States Patent
France et al.

(10) Patent No.: US 12,108,756 B2
(45) Date of Patent: Oct. 8, 2024

(54) PHOTODYNAMIC METHOD OF INHIBITING GROWTH OF A MICROBIAL PLANT PATHOGEN

(71) Applicant: TDA Research, Inc, Wheat Ridge, CO (US)

(72) Inventors: Christopher Brian France, Arvada, CO (US); William Bell, Boulder, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 0 days.

(21) Appl. No.: 17/278,657

(22) PCT Filed: Sep. 24, 2019

(86) PCT No.: PCT/US2019/052796
§ 371 (c)(1),
(2) Date: Mar. 23, 2021

(87) PCT Pub. No.: WO2021/061109
PCT Pub. Date: Apr. 1, 2021

(65) Prior Publication Data
US 2022/0110319 A1 Apr. 14, 2022

(51) Int. Cl.
*A01N 25/00* (2006.01)
*A01N 59/20* (2006.01)
(52) U.S. Cl.
CPC .............. *A01N 25/00* (2013.01); *A01N 59/20* (2013.01)

(58) Field of Classification Search
CPC .................................. A01N 25/00; A01N 59/20
See application file for complete search history.

(56) References Cited

U.S. PATENT DOCUMENTS

2017/0064964 A1\* 3/2017 Bell ........................ A01N 59/00

FOREIGN PATENT DOCUMENTS

| WO | WO-03075664 A1 \* | 9/2003 | ............. A01N 59/16 |
| WO | WO-2006108835 A2 \* | 10/2006 | ............. A01N 37/46 |

OTHER PUBLICATIONS

WO-2006108835-A2 text view translation (Year: 2006).\*

\* cited by examiner

*Primary Examiner* — Snigdha Maewall
(74) *Attorney, Agent, or Firm* — Brian J Elliott; Grace B Clinger

(57) ABSTRACT

We describe methods and materials for inhibiting the growth of a microbial pathogen of a plant. The method comprises the steps of applying to the plant a combination of a dye-bearing compound which is a reactive oxygen species photosensitizer; and a copper compound, which increases the microbial lethality of the dye-bearing compound towards the microbial pathogen; and exposing the plant to light to activate the combination of the dye-bearing compound and the copper compound and inhibiting growth of a microbial pathogen of a plant. The combination of the dye-bearing compound and the copper compound may result in a synergistic ability to reduce the growth of a plant pathogen.

34 Claims, 16 Drawing Sheets

Enol form

Keto form

| Exposure time (min) | 10 ppm CuSO4 / blue light | 10ppm CuSO4 / blue light | Riboflavin / blue light | Blue light only | 10 ppm CuSO4 in Dark | Riboflavin in Dark |
|---|---|---|---|---|---|---|
| 0 | 0 | 0 | 0 | 0 | 0 | 0 |
| 5 | 3.67 | | | | | |
| 15 | 6.89 | | | | | |
| 30 | 7.73 | 0.954 | 0.83 | 0.2775 | 0.226 | 0 |

Fig. 13

|   | Treatment | Average number of leaf spots |
|---|---|---|
| A | Non- inoculated control (water) | 0 |
| B | Inoculated control, 24 hours after bactericides applied (Xanthomonas) | 128 |
| C | 0.001% Ingredient C (copper sulfate), 0.0125% Silwet®, 0.002% Photoactivator Orange (riboflavin) | 55.4 |
| D | 0.001% Ingredient C, 0.100% Ingredient A (sodium ascorbate), 0.0125% Silwet®, 0.002% Photoactivator Orange (riboflavin) | 36.9 |
| E | 0.0125% Silwet®, 0.002% Photoactivator Orange (riboflavin) | 98.3 |
| F | CuPRO® T/N/O 2005 (copper hydroxide, containing 35% metallic copper equivalent) | 36.8 |

Fig. 16

PHOTODYNAMIC METHOD OF INHIBITING GROWTH OF A MICROBIAL PLANT PATHOGEN

STATEMENT REGARDING FEDERALLY SPONSORED RESEARCH OR DEVELOPMENT

This invention was made using U.S. government funding through the U.S. Department of Agriculture contract No. 2017-33610-27303. The government has certain rights in this invention.

FIELD OF THE INVENTION

The technical field generally relates to photodynamic inhibition of microbial pathogens in plants using compounds and compositions that include both a photosensitizer compound and a small, but synergistically effective, amount of a copper compound. More particularly, the technical field relates to photodynamic inhibition of microbial pathogens in plants where the inhibition is dramatically increased by small amounts of copper compounds. The field further relates to a method which can be used consistent with organic agricultural methods and which uses copper compounds at such low concentration as to be exempt from certain environmental regulations.

BACKGROUND

Inhibition of plant pathogens by reactive oxidizing species has an advantage in that resistance is slow to develop in the target organisms due to the mode of action. A second advantage is that oxidizing species generally present less environmental hazard than some other antimicrobials because they tend to decompose through reaction with common materials, and thus do not persist in the environment. A disadvantage to using oxidizing material as antimicrobials is related to their reactivity: because the oxidizers react quickly, their effect is not sustained. This can limit their effectiveness, and may require frequent re-application. An example is hydrogen peroxide, which is an effective antimicrobial and pesticide, but which has limited utility because common materials can react with hydrogen peroxide, including catalyzing its decomposition to water and oxygen.

Oxidizing antimicrobial species can also be produced at the site where they are required through a reaction driven by light energy. This process is sometimes called photodynamic therapy or photodynamic inhibition. Photodynamic inhibition of microbial pathogens involves exposing a photosensitive agent to light in order to generate reactive oxygen species (ROS), such as singlet oxygen, which can have detrimental effects on the microbial pathogens. This photodynamic therapy (PDT), consumes oxygen and produces at least one of several reactive oxygen species (ROS) including peroxides, superoxide anion ($O_2^{-1}$), hydroxyl radical ($\cdot OH$), hydroperoxyl radical ($\cdot OOH$) and singlet oxygen ($^1O_2$). PDT requires a photoactivator, or photocatalyst, which increases the efficiency of converting light energy to reactive oxygen species. This process is also referred to as antimicrobial photodynamic therapy (aPDT). Existing photodynamic inhibition techniques and applications have various shortcomings. For example, the photosensitive agents either have low effectiveness when used alone, are made from substances that are not consistent with organic agricultural practices, or both.

Another class of antimicrobial materials consists of copper compounds (e.g., copper sulfate (CuSO4) and copper hydroxide (Cu(OH)2). Copper compounds are used as pesticides; however, use of copper compounds as pesticides has several disadvantages. Firstly, because copper salts have been widely used as pesticides, some pests are developing resistance. Secondly, copper is also an environmental hazard, and its discharge to surface waters can be limited. Lastly, copper salts used as pesticides are applied to crops at high concentrations in water solution (for example copper sulfate at 1% in water) and evaporation can leave deposits on the crop. These deposits are undesirable and lower the value of the crop. The wide distribution of high levels of copper in the environment is a serious limitation to the continued use of high concentrations of copper-based antimicrobials in agriculture.

BRIEF DESCRIPTION OF THE INVENTION

The present invention solves the limitations of the prior art and provides a method for inhibiting the growth of a microbial pathogen of a plant, the method comprising: applying to the plant a combination comprising: a dye-bearing compound which is a reactive oxygen species photosensitizer; and a copper compound to increase the microbial lethality of the dye-bearing compound towards the microbial pathogen; and exposing the plant to light to activate the combination of the dye-bearing compound and the copper compound and inhibiting growth of a microbial pathogen of a plant. In certain embodiments the copper compound is a copper salt to increase the microbial lethality of the dye-bearing compound towards the microbial pathogen. The copper salt may be provided in an amount sufficient to increase microbial pathogen growth inhibition compared to the microbial pathogen growth inhibition of the reactive oxygen species photosensitizer alone.

In a particularly beneficial embodiment of the present invention the copper salt and the dye-bearing compound are provided in amounts that are synergistically effective to inhibit growth of the microbial pathogen. The synergistically effective inhibition of the growth of the microbial pathogen can be defined wherein the combination increases microbial pathogen kill by at least 1 order of magnitude compared to the kill that is expected based on an additive efficacy model. If the microbial pathogen kill is measured in log kill units, then synergistically effective kill is an increase in kill by 1 log unit. This additive efficacy model determines the expected percent kill as calculated by the expression, $P = X + Y(100-1)/100$, wherein P is the expected percent kill of the pathogen using the combination of the reactive oxygen species photosensitizer and the copper salt, X is the percent kill of the pathogen when the reactive oxygen species photosensitizer is used alone, and Y is the percent kill of the pathogen when the copper salt is used alone.

In preferred embodiments the dye-bearing compound is selected from the group consisting of a riboflavin, a derivatized riboflavin, a lumichrome, a derivatized lumichrome, a curcumin, a fluorescein, an eosin Y, an erythrosine, a flavin-containing compound and a rose bengal B. Most preferably, the dye-bearing compound is riboflavin.

In preferred embodiments, the copper salt is selected from the group consisting of a copper (II) sulfate, a copper (II) nitrate, a copper hydroxide, a copper carbonate, a copper chloride, a copper oxide, and a copper bromide.

In an optional embodiment, the method further comprises the step of applying an ascorbate to the plant to increase the microbial lethality of said combination towards the microbial pathogen.

In an embodiment, the dye-bearing compound may be provided at a concentration between about 1 and 100 ppm on a mass basis and the copper salt at a concentration between about 0.1 and 100 ppm of copper on a mass basis. More preferably, the dye-bearing compound is provided at a concentration between about 5 and 50 ppm on a mass basis and the copper salt is provided at a concentration between about 2 and 10 ppm on a mass basis of copper.

In an embodiment exposing the plant to light comprises exposing the plant to natural light, or alternatively, exposing the plant to light comprises exposing the plant to artificial light.

The combination may be applied to the plant by at least one of soil drenching, pipetting, irrigation, spraying, listing, sprinkling, pouring.

The microbial pathogen may comprise either a bacterial pathogen, a cyanobacterial, an algal, a fungal pathogen, or a viral pathogen. The plant may be a non-woody crop plant, a woody plant, a turfgrass, a fruit-bearing tree, a nut-bearing tree, or an ornamental plant. The combination may further comprise at least one agriculturally acceptable adjuvant, and the agriculturally acceptable adjuvant may be selected from the group consisting of a surfactant, a penetrant, a wetting agent, a spreading agent, a humectant and an emulsifier.

The dye-bearing compound and the copper salt may be applied simultaneously to the plant or applied sequentially to the plant. The combination may be applied to the plant by applying a composition comprising the components of the combination, to the plant.

In a preferred embodiment, the copper salt is used at a concentration below 100 ppm on a mass basis to avoid unwanted damage to the plant or the environment. In another embodiment, the dye-bearing compound and the copper salt are suitable for organic agricultural practices.

In an optional embodiment the method further comprises the step of applying to the plant an ascorbic acid and a sodium bicarbonate to react with the copper salt to generate a reactive oxygen species, or alternatively an ascorbate salt to react with the copper salt to generate a reactive oxygen species. The method ascorbate salt may be an agriculturally acceptable salt.

In a preferred embodiment, the dye-bearing compound which is a reactive oxygen species photosensitizer is selected from the group consisting of a riboflavin, a derivatized riboflavin, a lumichrome, a derivatized lumichrome, a curcumin, a fluorescein, an eosin Y, an erythrosine, and a rose bengal B; and wherein the copper compound is a copper ion-bearing organic complex to increase the microbial lethality of the dye-bearing compound towards the microbial pathogen.

In an optional embodiment, the copper ion-bearing organic complex is provided in an amount sufficient to increase microbial pathogen growth inhibition compared to the microbial pathogen growth inhibition of the reactive oxygen species photosensitizer alone.

In a preferred embodiment, the copper ion-bearing organic complex and the dye-bearing compound are provided in amounts that are synergistically effective to inhibit growth of the microbial pathogen, wherein said combination increases microbial pathogen growth inhibition to an extent that is greater than the sum of the microbial pathogen growth inhibition of the reactive oxygen species photosensitizer and the copper ion-bearing organic complex when each is used alone. In another embodiment, the copper ion-bearing organic complex and the dye-bearing compound are provided in amounts that are synergistically effective to inhibit growth of the microbial pathogen, wherein the combination increases microbial pathogen log kill by at least 1 log, or at least 1 order of magnitude, compared to the log kill that is expected based on an additive efficacy model. the additive efficacy model determines the expected percent kill as calculated by the expression, $P=X+Y(100-1)/100$, wherein P is the expected percent kill of the pathogen using the combination of the reactive oxygen species photosensitizer and the copper ion-bearing organic complex, X is the percent kill of the pathogen when the reactive oxygen species photosensitizer is used alone, and Y is the percent kill of the pathogen when the copper ion-bearing organic complex used alone. In a preferred embodiment, the dye-bearing compound is riboflavin. In other preferred embodiments the copper ion-bearing organic complex is selected from the group consisting of a copper ethanolamine, a copper EDTA, a copper ion complexed to a crown ether, and a copper ion complexed to polyethylene glycol. The method of may further comprise at least one agriculturally acceptable adjuvant, optionally the agriculturally acceptable adjuvant is selected from the group consisting of a surfactant, a penetrant, a wetting agent, a spreading agent, a humectant and an emulsifier.

In optional embodiments, the dye-bearing compound and the copper ion-bearing organic complex are applied simultaneously to the plant, or optionally applied sequentially to the plant. The method may comprise applying the combination to the plant by applying a composition comprising the components of the combination, to the plant.

Preferably, the copper ion-bearing organic complex is used at a concentration below 100 ppm on a mass basis to avoid unwanted damage to the plant or the environment. Preferably, the dye-bearing compound and the copper ion-bearing organic complex are suitable for organic agricultural practices.

In an optional embodiment the method may comprise the step of applying to the plant an ascorbic acid and a sodium bicarbonate to react with the copper salt to generate a reactive oxygen species or applying to the plant an ascorbate salt to react with the copper salt to generate a reactive oxygen species. The ascorbate salt may be an agriculturally acceptable salt.

BRIEF DESCRIPTION OF THE DRAWINGS

FIG. 4: Structure of modified flavin, FLASH-01a.
FIG. 5: Structure of modified flavin, FLASH-07a.
FIG. 13: Data from Example 1.

FIG. 16: Results of *Xanthomonas hortorum* pv. *Pelargonii* on geranium (see Example 5).

DETAILED DESCRIPTION OF THE INVENTION

Various compositions and methods are described herein for photodynamic inhibition of microbial pathogens on plants. Photodynamic inhibition of bacterial, fungal, viral, or microbial pathogens can be performed by applying to the plant the photosensitizer compound and the copper compound, which may optionally be a copper salt or a copper ion-bearing organic complex, and exposing the plant to light. The photosensitizer compound may be optionally selected from the group consisting of a riboflavin, a derivatized riboflavin, a lumichrome, a derivatized lumichrome, a curcumin, a fluorescein, an eosin Y, an erythrosine, a flavin-containing compound and a rose bengal B.

Surprisingly, we have found that the antimicrobial effect from light-driven production of reactive oxygen species (ROS) is dramatically enhanced by the presence of low levels of copper compounds, such as copper salts. For example, the combination of photosensitizer and copper salts produces an antimicrobial effect that is much greater than that produced by either the light-driven antimicrobial process or the copper salt separately and is more than the additive effects of each. One example is a combination of a light-driven process in which the photoactivator is riboflavin and copper sulfate is added (see Example 1 below). Riboflavin (Vitamin B2) is a naturally occurring material that is safe for human consumption and the environment. As a vitamin it is an essential human nutrient. Both riboflavin and copper salts are on the U.S. Food and Drug Administration (FDA) Generally Recognized as Safe (GRAS) list. Antimicrobial or pesticidal formulations containing riboflavin and copper could qualify as organic pesticides and be used to grow organic produce.

Certain embodiments of the present invention use a combination of a photoactivator and a copper salt. These two components may be combined as a mixture in a solvent. For example, both the photoactivator and the copper salt may be dissolved in water. The mixture need not be completely homogeneous. If copper is used, the copper salt may be Cu+1 or Cu+2.

Photosensitizers

Figure 1:
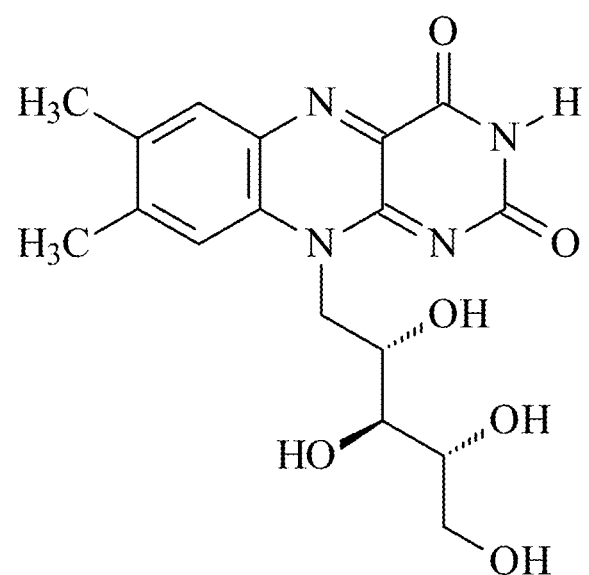
FIG. 1: Structure of riboflavin.
Figure 2:
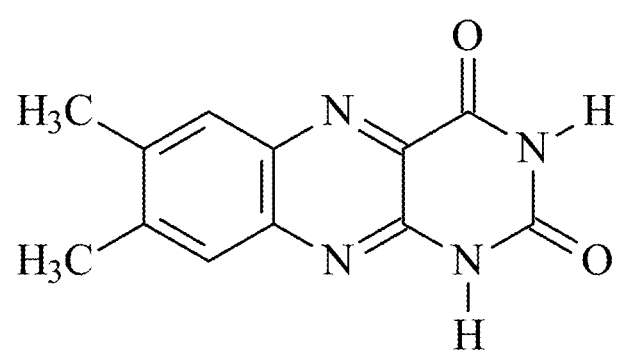
FIG. 2: Structure of lumichrome.
Figure 3:
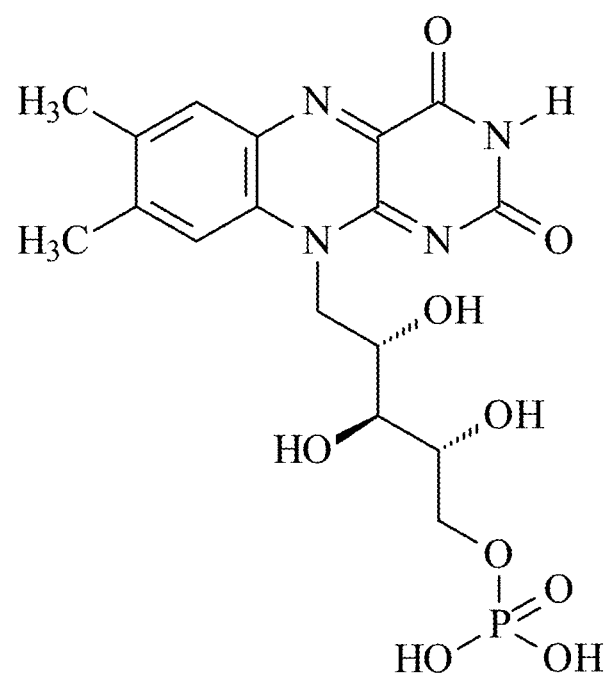
FIG. 3: An example of a Flavin-containing compound, flavin mononucleotide.
Figure 4:
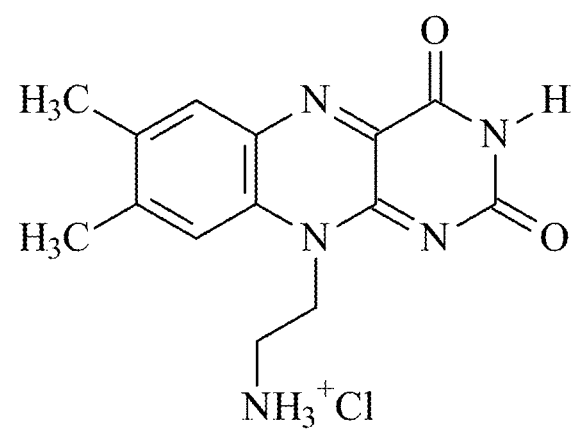
Figure 5:
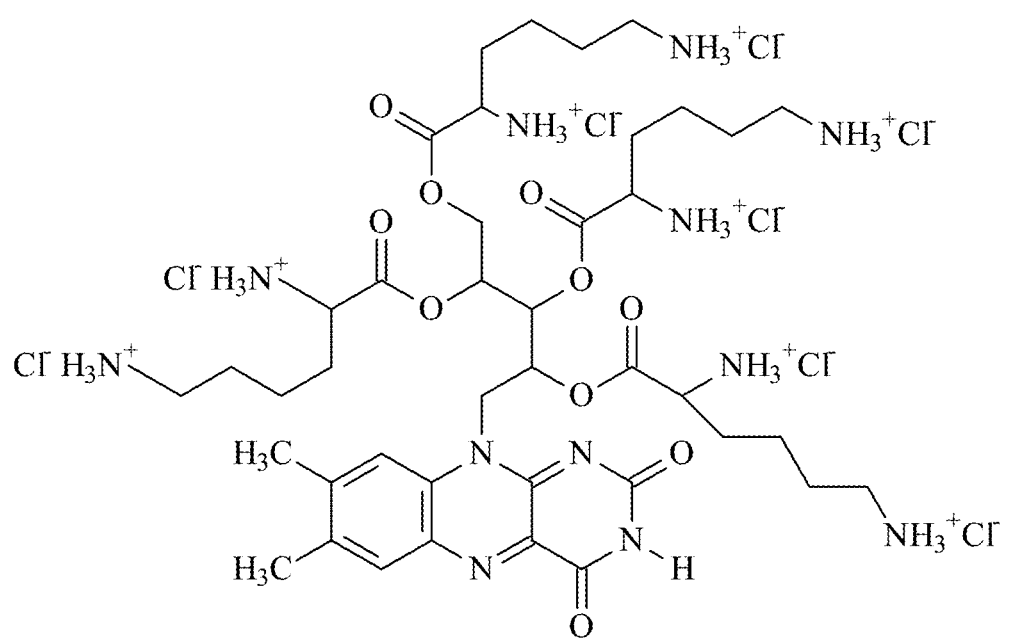
Figure 6:
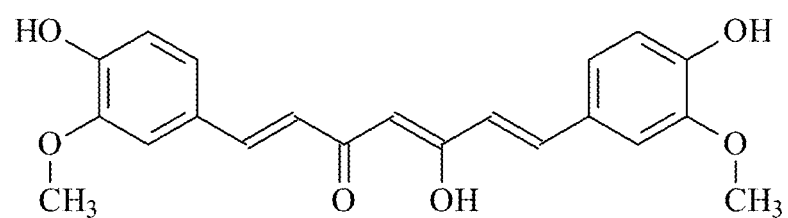
FIG. 6: Structure of curcumin, enol and keto forms.
Figure 6:
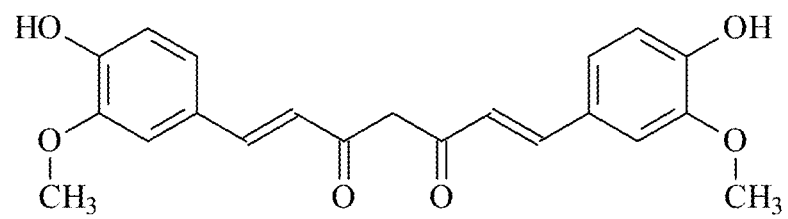
Figure 7:
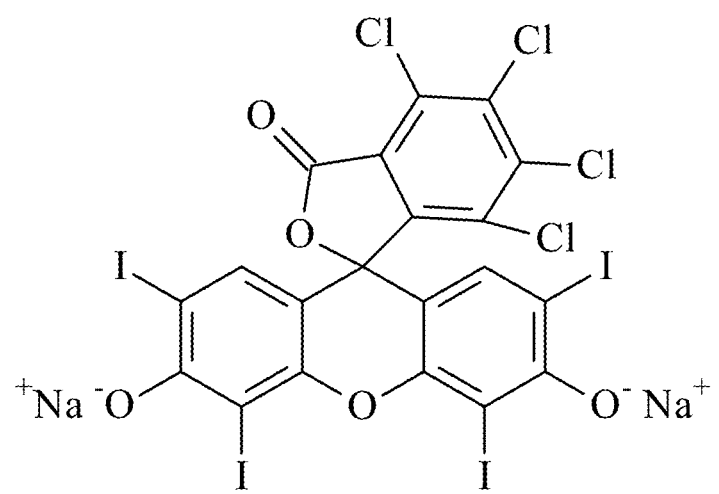
FIG. 7: Structure of halogenated xanthene Rose Bengal.
Figure 8:
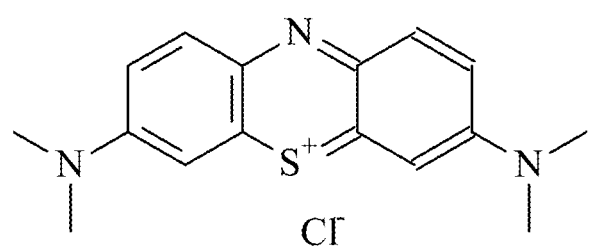
FIG. 8: Structure of phenothiazinium methylene blue.
Figure 9:
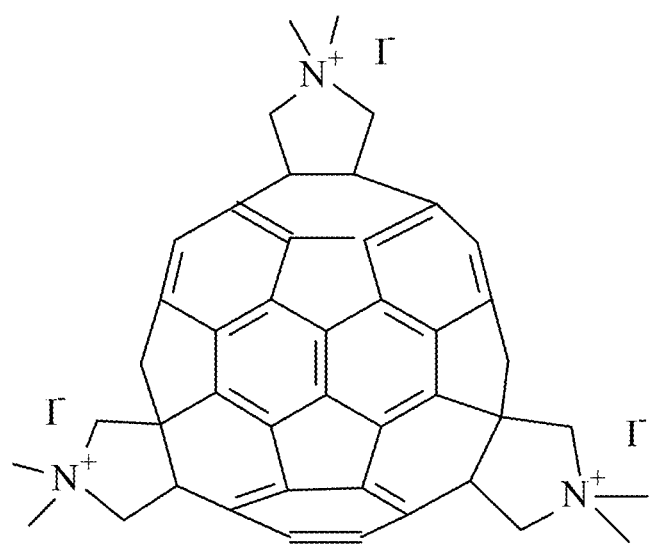
FIG. 9: Representative structure of triscationic fullerene BB6.
Figure 10:
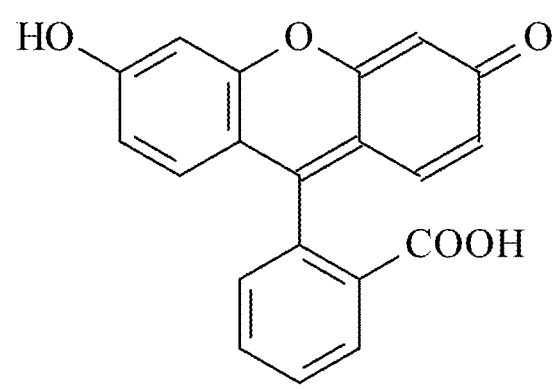
FIG. 10: Structure of fluorescein.
Figure 11:
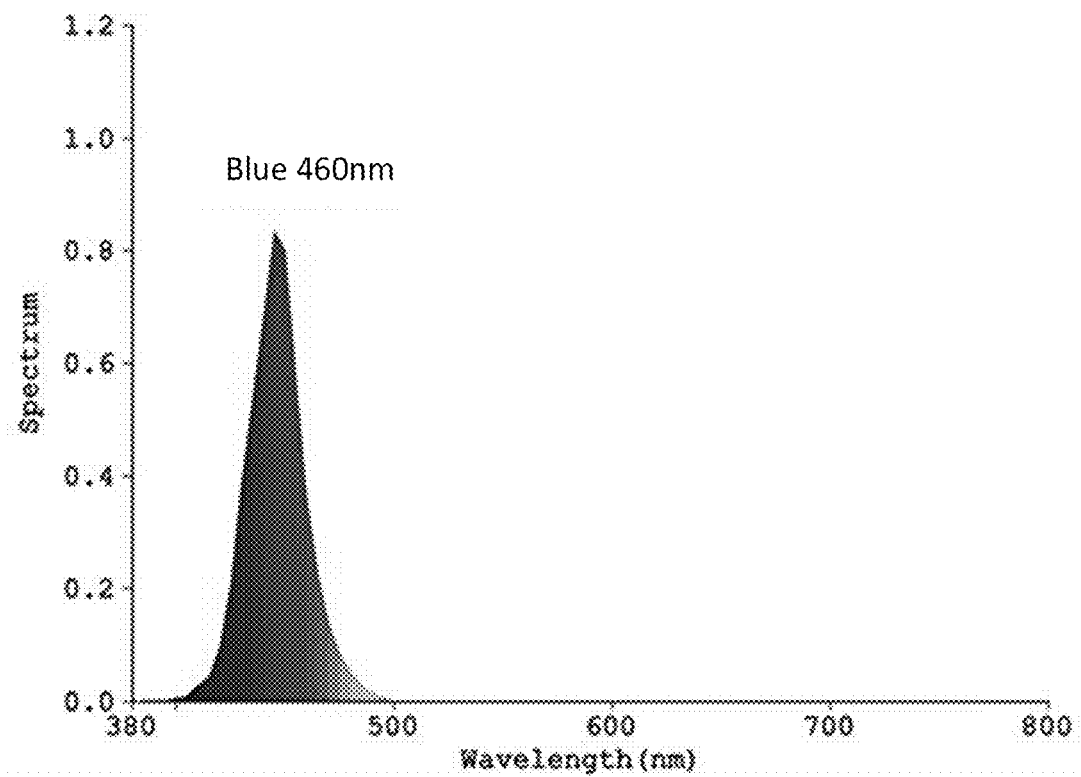
FIG. 11: HIGROW HG-GL36B output light 6spectrum

The photosensitizer may be any material that absorbs light (UV and/or visible light) and efficiently converts that light to an energetic intermediate that can interact with copper to produce the synergistic effect. As shown in Example 2, we have tested riboflavin, erythrosine, Rose Bengal and Eosin Y; all of these were effective, with riboflavin being the most effective under the test conditions. Lumichrome, which is produced by the photodecomposition of riboflavin, and riboflavin tetraacetate (2',3',4',5'-tetraacetylriboflavin) are effective in photosensitized reactions. Charged, for example positively charged, functional groups may be added to flavin derivatives to enable attachment of these molecules to the negatively charged surface of bacteria or to enhance solubility in water (FIG. 2). Compounds comprising a suitable chromophore with a range of additional functionality, including partial decomposition products of a photosensitizer, may be suitable photosensitizers for use in the present invention.

As discussed above, photosensitizer compounds can be used to enable photodynamic inhibition of microbial pathogens that are present on plants. The photosensitizer compounds react to light by generating reactive oxygen species (ROS). Depending on the type of ROS generated, photosensitizers can be classified into two classes, namely Type I photosensitizers and Type II photosensitizers. On the one hand, Type I photosensitizers form short lived free radicals through electron abstraction or transfer from a substrate when excited at an appropriate wavelength in the presence of oxygen. On the other hand, Type II photosensitizers form a highly reactive oxygen state known as "singlet oxygen", also referred to herein as "reactive singlet oxygen species". Singlet oxygens are generally relatively long lived and can have a large radius of action.

It should be understood that photosensitizer compounds in general can be metallated or non-metallated. Preferred embodiments of the present invention are non-metallated. Certain metallated photosensitizers are known to have reduced effectiveness when they are in a metallated state. For example, when Chlorin photosensitizer compounds are metallated with copper, the ROS that are generated (Type I) tend to have low availability for microbial inhibition, for instance due to a very short half-life. In contrast, when the same photosensitizer compounds are metallated with other metals, such as magnesium, the ROS that are generated have higher availability for microbial inhibition. Thus, copper used in near stoichiometric amount with the photosensitizer (to metallate the photosensitizer) is not advantageous. It should also be understood that copper, at least in higher concentrations, is known to have negative effects on Type II photosensitizers. It should be understood that selecting metals that do not allow for the formation of Type II photosensitizers typically results in a much lower inhibition of the growth of microbial pathogens, at least because no, or less reactive singlet oxygen species are generated. Non-limiting examples of metals that are known to not form Type II photosensitizers when complexed with chlorins are Cu, Co, Fe, Ni and Mn. Thus, the synergistic effects of the combination of a photosensitizer and a small amount of copper-containing compounds, in particular the preferred embodiments of the present invention, are surprising and counter to existing understanding of how copper could cause negative effects on the inhibition of plant pathogens using photosensitizers.

The metallated state is not to be confused with a mixture of a separate non-metallated photosensitizer and a metal salt or other metal-containing compound. The preferred photosensitizers of the present invention are not used in a form where the photosensitizer compound itself is bonded to, or chemically complexed with, a metal ion.

It should be understood that the term "singlet oxygen photosensitizer", as used herein, refers to a compound that produces reactive singlet oxygen species when excited by light. In other words, the term refers to a photosensitizer in which the Type II process defined above is dominant compared to the Type I process.

Also relevant to the selection of potential photosensitizers for the present invention is the work by researchers at the Procter & Gamble Company described in these U.S. patent applications: US. 2015/0208896, US 2015/0208898, US 2015/0209808, US 2015/0210960, US 2015/0210963, US 2015 0210964, US 2015/0211165, and US 2015/0211170, which are incorporated by reference, herein.

The photosensitizer may optionally comprise a photoactive moiety selected from the group consisting of 1,1'-biphenyl-4,4'-diamine, 1,1'-biphenyl-4-amine, benzophenone, 1,1'-biphenyl-4,4'-diol, 1,1'-biphenyl-4-amine, 1,1'-biphenyl-4-ol, 1,1':2',1''-terphenyl, 1,1':3',1''-terphenyl, 1,1':4',1'':4'',1'''-quaterphenyl, 1,1':4',1''-terphenyl, 1,10-phenanthroline, 1,1'-biphenyl, 1,2,3,4-dibenzanthracene, 1,2-benzenedicarbonitrile, 1,3-isobenzofurandione, 1,4-naphthoquinone, 1,5-naphthalenediol, 10H-phenothiazine, 10H-phenoxazine, 10-methylacridone, 1-acetonaphthone, 1-chloroanthraquinone, 1-hydroxyanthraquinone, 1-naphthalenecarbonitrile, 1-naphthalenecarboxaldehyde, 1-naphthalenesulfonic acid, 1-naphthalenol, 2(1H)-quinolinone, 2,2'-biquinoline, 2,3-naphthalenediol, 2,6-dichlorobenzaldehyde, 21H,23H-porphine, 2-aminoanthraquinone, 2-benzoylthiophene, 2-chlorobenzaldehyde, 2-chlorothioxanthone, 2-ethylanthraquinone, 2H-1-benzopyran-2-one, 2-methoxythioxanthone, 2-methyl-1,4-naphthoquinone, 2-methyl-9 (10-methyl)-acridinone, 2-methylanthraquinone, 2-methylbenzophenone, 2-naphthalenamine, 2-naphthalenecarboxylic acid, 2-naphthalenol, 2-nitro-9(10-methyl)-acridinone, 9(10-ethyl)-acridinone, 3,6-qcridinediamine, 3,9-dibromoperylene, 3,9-dicyanophenanthrene, 3-benzoylcoumarin, 3-methoxy-9-cyanophenanthrene, 3-methoxythioxanthone, 3'-methylacetophenone, 4,4'-dichlorobenzophenone, 4,4'-dimethoxybenzophenone, 4-bromobenzophenone, 4-chlorobenzophenone, 4'-fluoroacetophenone, 4-methoxybenzophenone, 4'-methylacetophenone, 4-methylbenzaldehyde, 4-methylbenzophenone, 4-phenylbenzophenone, 6-methylchromanone, 7-(diethylamino)coumarin, 7H-benz[de]anthracen-7-one, 7H-benzo[c]xanthen-7-one, 7H-furo[3,2-g][1]benzopyran-7-one, 9(10H)-acridinone, 9(10H)-anthracenone, 9(10-methyl)-acridinone, 9(10-phenyl)-acridinon, 9,10-anthracenedione, 9-acridinamine, 9-cyanophenanthrene, 9-fluorenone, 9H-carbazole, 9H-fluoren-2-amine, 9H-fluorene, 9H-thioxanthen-9-ol, 9H-thioxanthen-9-one, 9H-thioxanthene-2,9-diol, 9H-xanthen-9-one, acetophenone, acridene, acridine, acridone, anthracene, anthraquinone, anthrone, α-tetralone, benz[a]anthracene, benzaldehyde, benzamide, benzo[a]coronene, benzo[a]pyrene, benzo[f]quinoline, benzo[ghi]perylene, benzo[rst]pentaphene, benzophenone, benzoquinone, 2,3,5,6-tetramethyl, chrysene, coronene, dibenz[a,h]anthracene, dibenzo[b,def]chrysene, dibenzo[c,g]phenanthrene, dibenzo[def,mno]chrysene, dibenzo[def,p]chrysene, DL-tryptophan, fluoranthene, fluoren-9-one, fluorenone, isoquinoline, methoxycoumarin, methylacridone, michler's ketone, naphthacene, naphtho[1,2-g]chrysene, N-methylacridone, p-benzoquinone, p-benzoquinone, 2,3,5,6-tetrachloro, pentacene, perylene quinonoid pigments, phenanthrene, phenanthrenequinone, phenanthridine, phenanthro[3,4-c]phenanthrene, phenazine, phenothiazine, p-methoxyacetophenone, pyranthrene, pyrene, quinoline, quinoxaline, riboflavin 5'-(dihydrogen phosphate), thioxanthone, thymidine, xanthen-9-one, xanthone, and mixtures thereof. Other suitable water-soluble photoactivators include fluoresceins and derivatives thereof; preferably halogen substituted fluoresceins; more preferably bromo- and iodo-fluoresceins such as dibromo fluorescein, diiodo fluorescein, rose bengal, erythrosine, eosin (e.g. Eosin Y), curcum in, protoporphyrin IX, resazurin, dichlorodihydrofluorescein diacetate, dihydrorhodamine 123 and related chromophores, methylene blue, and rose Bengal.

Copper-Containing Compounds

Copper compounds of the present invention may include copper salts (preferably Cu+2, and also optionally Cu+1), and copper-organic complex compounds such as copper ethanolamine complex. Non-limiting examples include copper (II) sulfate, copper (II) nitrate, copper hydroxide, copper carbonate, copper chloride, copper oxide, copper octanoate, copper bromide (or the reduced products of these salts in their copper+1 state), as well as copper ethanolamine complex, copper gluconate, copper orthophosphate, copper pyrophosphate, or agriculturally acceptable salts and their hydrated forms thereof.

In defining a plant protection product using the synergy between photoactivators producing reactive oxygen species (ROS) and copper, we need to consider what copper compounds would be acceptable. Although experiments with *E. coli* using elemental copper did not indicate significant performance, successful tests should not necessarily be based solely on soluble salts or soluble compounds. Further, the practice of this invention should not be limited to only formulations with highly soluble copper soluble salts, because sparingly soluble salts are effective. Other forms of suspended copper may be effective.

The solubility of Cu+2 salts in water is a function of pH, and is also affected by the presence of carbonate and bicarbonate. Copper salts are generally soluble in pH 5.5 distilled water. At higher pH values, the amount of soluble copper is a function of both pH and the total copper concentration, with a maximum of 4 mg/l soluble copper at pH 6.5 and a maximum of 1.3 mg/l soluble copper at pH 7.4. The present invention teaches the critical contribution that a low level of coper compound has on the synergistic effect with the photosensitizer on decreasing the growth of a plant pathogen. In a preferred embodiment, only 10 mg/l of copper sulfate is used, or 4 mg/l of copper. It should be clear that the present invention is operable even when using copper compounds with limited solubility in water, including formulations designed for controlled release.

Combination of Photosensitizer and Copper-Containing Compound

The combination of a photosensitizer and a copper-containing compound lead to the reduction in plant pathogen growth which is far greater than the individual contributions of either ingredient when used separately. Plant pathogens that this method can retard the growth of, include Gram-negative bacteria, Gram-positive bacteria, cyanobacteria, algae, fungi, and viruses.

It should be understood that when a combination of photosensitizer compound, a copper-containing compound and any other optional additives or adjuvants is described throughout the present description and claims, an agriculturally effective amount of each one of the components of the combination can be used so as to provide the anti-microbial activity while being minimally or non-phytotoxic to the host plant.

In some implementations, the methods and compositions described herein include one or more agriculturally suitable adjuvants. In some implementations, each of the one or more agriculturally suitable adjuvants is independently selected from the group consisting of one or more activator adjuvants (e.g., one or more surfactants; one or more oil adjuvants, e.g., one or more penetrants) one or more wetting or spreading agents; one or more humectants; one or more emulsifiers; one or more drift control agents; one or more thickening agents; one or more deposition agents; one or more water conditioners; one or more buffers; one or more anti-foaming agents; one or more UV blockers; one or more antioxidants; one or more fertilizers, nutrients, and/or micronutrients; and/or one or more herbicide. Exemplary adjuvants are provided in Hazen, J. L. Weed Technology 14: 773-784 (2000), which is incorporated by reference in its entirety.

The photosensitizer compound and the copper-containing compound can be provided as part of an anti-microbial composition. The anti-microbial composition can also include a delivery fluid, such as water. The anti-microbial composition can be provided to have certain concentrations and relative proportions of components. For example, the antimicrobial composition can have between about 100 nM and about 50 mM, between 1 micromolar and about 1000 micromolar, between 5 micromolar and about 200 micromolar of the photosensitizer compound, between about 10 micromolar and about 150 micromolar of the photosensitizer compound, between about 20 micromolar and about 100 micromolar of the photosensitizer compound, or between about 25 micromolar and about 75 micromolar of the photosensitizer compound.

The anti-microbial composition can also have between about 2 micromolar and about 10,000 micromolar of the copper-containing compound, between about 5 micromolar and about 5,000 micromolar of the copper-containing compound, between about 10 micromolar and about 1,000 micromolar of the copper-containing compound, between about 25 micromolar and about 500 micromolar of the copper-containing compound, between about 50 micromolar and about 100 micromolar of the copper-containing compound, for example. It is noted that 1 micromole/L copper=0.0635 mg/L. Also, 10 ppm CuSO4 is equivalent to 4 ppm copper, which is 62.7 micromolar.

The relative proportion, by weight, of the photosensitizer compound and the copper-containing compound in the anti-microbial composition can be between about 1000:1 and about 1:1000, between about 500:1 and about 1:500, between about 100:1 and about 1:100, or between about 10:1 and about 1:10, for example.

The relative molar ratio of copper to photosensitizer is most preferably around 1:1.

In terms of other additives that can be present in the anti-microbial compositions, a surfactant can be present as an adjuvant to aid coverage of plant foliage. The surfactant can be an acceptable polysorbate type surfactant (e.g. Tween® 80), a nonionic surfactant blend (e.g., Altox™ 3273), or another suitable surfactant.

Application of Photosensitizer and Copper-Containing Compounds

The photosensitizer compound and the enhancer compound can be applied to plants for photodynamic inhibition of microbial pathogens. The photosensitizer compound and the enhancer compound can be applied simultaneously to the plants. For example, an anti-microbial composition can be prepared to include the photosensitizer and enhancer compounds as well as a delivery fluid. The antimicrobial composition can be applied to the plant by spraying, misting, sprinkling, pouring, or any other suitable method. The anti-microbial composition can be applied to the foliage, roots and/or stem of the plant. Other additives can also be included in the anti-microbial composition, and other application methods can also be performed.

The plants on which the anti-microbial composition is applied can be outdoors or indoors (e.g., greenhouse) where they are exposed to natural sunlight, or in an indoor location where they are exposed to artificial light. The exposure to the incident light is provided such that the photosensitizer compound can generate ROS that, in turn, facilitate disruption of microbial growth.

In operation, the photosensitizer compound and the enhancer compound are brought into contact with the microbial pathogen that has infected a plant. The photosensitizer compound and the enhancer compound both come into contact with the cell walls and intercellular material of the pathogenic microbes.

Ascorbic Acid or Ascorbate Additive

Ascorbic acid (otherwise known as Vitamin C) is an optional additive that can further enhance the lethality of the antimicrobial composition of the present invention. Ascorbic acid is a solid and has a pKa of 4.17. The plant protection formulations of the present invention are buffered to produce a solution pH of 7 and thus it is primarily in the form of ascorbate. Small amounts of copper have been shown to catalyze the oxidation of ascorbate and produce ROS, including hydrogen peroxide (Zhu et al, RSC Adv., 2016, 6, 38541). These are useful for controlling plant pathogens, even in the dark (for example at night).

Ascorbic acid can be added to supplement the photosensitized antimicrobial performance when disease pressure is high, or light intensity is expected to be low (for example heavily overcast days, evening or night applications). The effect of the ascorbate oxidation in the presence of copper can be controlled by controlling the concentration of ascorbate added. High concentrations will produce a longer effect while low concentrations will provide a shorter effect. In plant protection applications including high concentrations of ascorbic acid can be problematic because of the ion strength of resulting solution which must be included to maintain a neutral pH and convert the ascorbic acid to ascorbate would be excessively high and thus be salty.

For photodynamic therapy for plant protection applications such as those described in this invention, ascorbic acid incorporation into the formulation has been found to be beneficial at the weight percent levels of between 10 and 0.0001%, between 5 and 0.005%, between 1 and 0.01% ascorbate.

Microbial Pathogens and Plants

The microbial pathogens to which the anti-microbial composition can be applied include fungal and bacterial pathogens. The fungal pathogens to which the anti-microbial composition can be applied include *Alternaria solani*, which can infect plants such as tomatoes and potatoes; *Botrytis cinerea*, which can infect grapes, as well as soft fruits and bulb crops; or *Sclerotinia homoeocarpa*, which can commonly infect turfgrasses. Other fungal pathogens in the *Alternaria*, *Botrytis* or *Sclerotinia* genera can also receive application of the anti-microbial composition. The anti-microbial composition can be applied to plants that are affected or susceptible to pathogens that cause various plant diseases, e.g., *Colletotrichum, Fusarium, Puccinia, Erysiphaceae, Cercospora, Rhizoctonia, Bipolaris, Microdochium, Venturia inaequalis, Monilinia fructicola, Gymnosporangium juniperi-virginianae, Plasmodiophora brassicae, Ustilago zeae, Phytophthora, Pythium, Fusarium oxysporum, Phytophthora infestans, Taphrina deformans*, Powdery Mildew, *Phragmidium* spp., or other fungal pathogens.

The bacterial pathogens to which the anti-microbial composition can be applied include gram-negative bacteria, such as *Erwinia amylovara*, or other bacterial pathogens in the genus *Erwinia* that can infect woody plants. *E. amylovara* causes fire blight on various plants, including pears, apples, and other *Rosaceae* crops. The anti-microbial composition can be applied to plants that are affected or susceptible to pathogens that cause various plant diseases, e.g., *Pseudomonas, Xanthomonas, Agrobacterium, Curtobacterium, Streptomyces, E. Coli, Xylella fastidiosa* (which causes Olive Quick Decline Syndrome (OQDS) disease), or other bacterial pathogens.

The anti-microbial composition can be used for various types of plants that are affected by microbial pathogens. Crop plants, lawn plants, trees and other plants infected with microbial pathogens can be treated. It is also noted that the anti-microbial compositions described herein can have various inhibitory effects on the microbial pathogens depending on the type of plant and pathogen as well as the state of microbial infection. While herein it is described that the anti-microbial composition can inhibit microbial pathogen growth on a plant, such expressions should not be limiting but should be understood to include suppression of microbial pathogens, prevention against microbial pathogens, destruction of microbial pathogens or generally increasing toxicity toward microbial pathogens.

Types of Plants

The compound or composition may be used for various types of plants that may be affected microbial pathogens. The plant can be a non-woody crop plant, a woody plant or a turfgrass. The plant can be selected from the group consisting of an edible crop plant, a non-edible crop plant, a fruit plant, a vegetable plant, a legume plant, a cereal plant, a fodder plant, an oil seed plant, a field plant, a garden plant, a greenhouse plant, a house plant, a flower plant, a lawn plant, a turfgrass, a tree such as a fruit-bearing tree, and other plants that may be affected by microbial pathogens.

In some implementations, the plant is a turfgrass. As used herein, the term "turfgrass" refers to a cultivated grass that provides groundcover, for example a turf or lawn that is periodically cut or mowed to maintain a consistent height. Grasses belong to the Poaceae family, which is subdivided into six subfamilies, three of which include common turfgrasses: the Festucoideae subfamily of cool-season turfgrasses; and the Panicoideae and Eragrostoideae subfamilies of warm-season turfgrasses. A limited number of species are in widespread use as turfgrasses, generally meeting the criteria of forming uniform soil coverage and tolerating mowing and traffic. In general, turfgrasses have a compressed crown that facilitates mowing without cutting off the growing point. In the present context, the term "turfgrass" includes areas in which one or more grass species are cultivated to form relatively uniform soil coverage, including blends that are a combination of differing cultivars of the same species, or mixtures that are a combination of differing species and/or cultivars.

In some scenarios, the combinations can exhibit a synergistic response for inhibiting growth of microbial pathogens in plants. It should be understood that the terms "synergy" or "synergistic", as used herein, refer to the interaction of two or more components of a combination (or composition) so that their combined effect is greater than the sum of their individual effects, this may include, in the context of the present description, the action of two or more of the photosensitizer, the copper-containing compound.

In some scenarios, the approach as set out in S. R. Colby, "Calculating synergistic and antagonistic responses of herbicide combinations", Weeds 15, 20-22 (1967), can be used to evaluate synergy. Expected efficacy, E, may be expressed as: $E=X+Y-[(X*Y)/100]$, where X is the efficacy, expressed in % of the untreated control, of a first component of a combination, and Y is the efficacy, expressed in % of the untreated control, of a second component of the combination. The two components are said to be present in synergistically effective amounts when the observed efficacy is higher than the expected efficacy. More preferably, in the present invention, the two components are said to be present in synergistically effective amounts when the observed efficacy is at least one order of magnitude higher than the expected efficacy, and more preferably when the observed efficacy is at least two orders of magnitude higher than the expected efficacy, and most preferably when the observed efficacy is three or more orders of magnitude higher than the expected efficacy.

The application of the formulations of the present invention may be made to the plant either before or after the plant is infected with the plant pathogen. Thus, the method could be used as a preventative method or as a treatment for an infected plant.

EXAMPLES AND EXPERIMENTATION

Example 1

Photodynamic Treatment of *E. Coli* Using 10 ppm CuSO4 and 18 ppm Riboflavin with an LED Blue Light Source Tests were carried out with *Escherichia coli* (*E. coli*) bacteria (ATCC 25922) in which the organisms were exposed to varying test conditions. The light source for photoactivation was a blue LED light (HIGROW 2019) that was placed 7 cm from the container containing the *E. coli*. The photoactivator was riboflavin (Aldrich R7649, lot VVXBB4048V, purity 98.6%) at a concentration of 18 ppm. Copper sulfate was used at a concentration of 10 ppm (aqueous solution). The tests included a wetting agent Silwet® L-77 at a concentration of 0.0125%. Silwet® L-77 is a product of Helena Agri-Enterprises, LLC of Collierville, TN, and is a nonionic organosilicone surfactant co-polymer that has enhanced wetting and spreading characteristics when used in aqueous sprays. Silwet® L-77 has a CAS Registry Number of 27306-78-1. Each test was carried out for the prescribed time, which varied from 5 minutes to 30 minutes. At the end of the exposure time the bacteria were diluted and plated so that the colonies could be enumerated and the corresponding reduction determined by comparison with the untreated control.

Figure 12:
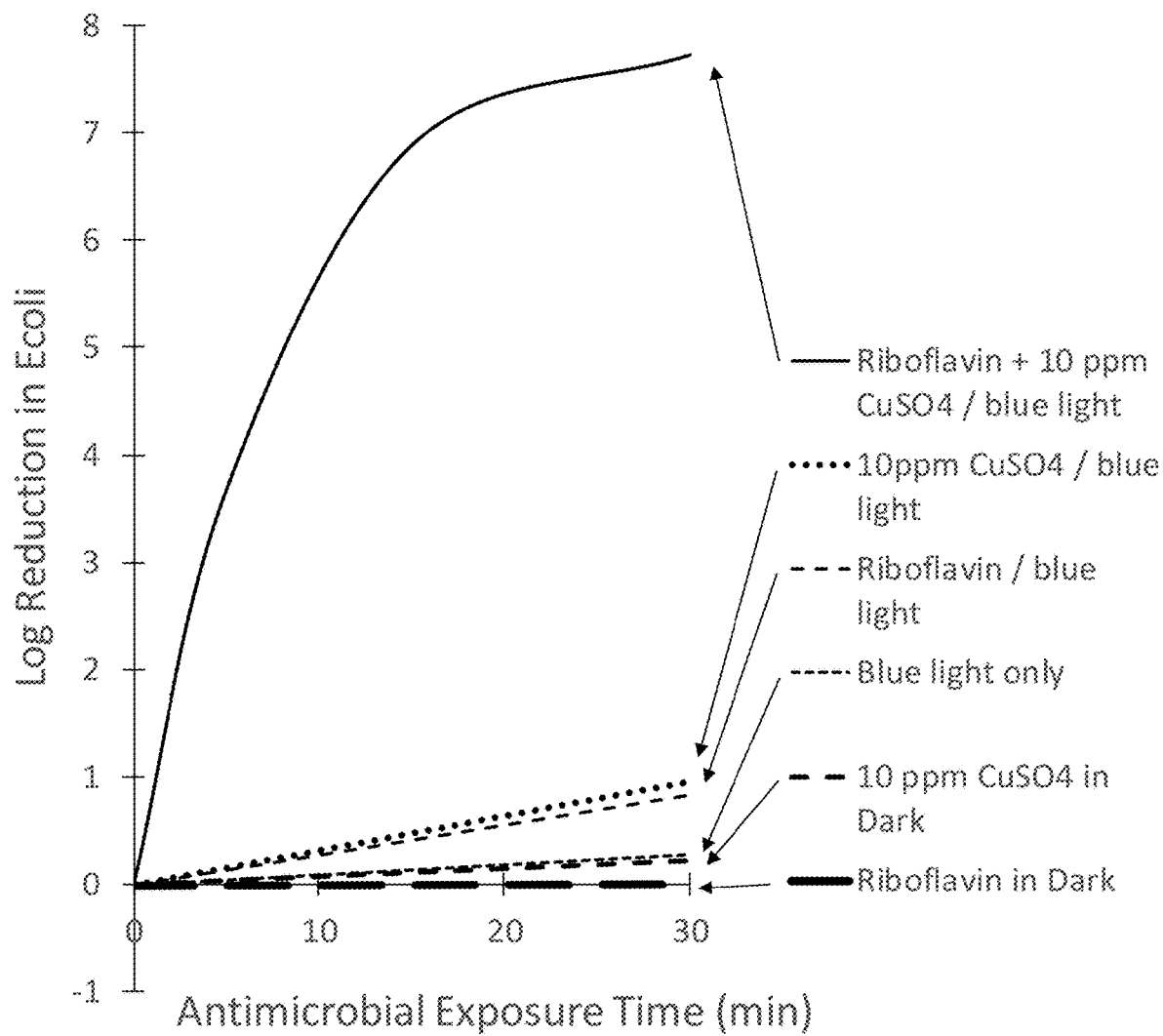
FIG. 12: Results from Example 1.

The results are presented in FIG. 12 and are summarized below. 18 ppm riboflavin in the dark did not produce any measurable kill. 10 ppm copper sulfate in the dark gave only a 0.226-log kill in 30 minutes. The blue light alone (with no copper or photosensitizer) produced a 0.2775-log kill after 30 minutes. 18 ppm riboflavin alone in the blue light produced a small amount of kill, with 0.83-log kill after 30 minutes. 10 ppm copper sulfate alone in the blue light produced a small amount of kill, with 0.954-log kill after 30 minutes. Surprisingly, 10 ppm copper sulfate and 18 ppm riboflavin in the blue light gave a 3.67-log kill in 5 minutes, a 6.89-log kill in 15 minutes and complete kill (7.73-log kill) in 30 minutes.

The expected efficacy, E, based on the 10 ppm copper sulfate alone and the 18 ppm riboflavin alone can be calculated as: $E=X+Y(100-X)/100$, where X is the efficacy, expressed in % of the untreated control, of a first component of a combination, and Y is the efficacy, expressed in % of the untreated control, of a second component of the combination. We first must convert the above log kill data to percent *E. coli* present (compared to the control inoculation). The formula to convert Log reduction to percent reduction is % reduction=$(1-10^{-L})\times 100$, where L is the Log reduction. Thus, 18 ppm riboflavin alone in the blue light produced a 0.83-log kill after 30 minutes, which is an 85.208% reduction. 10 ppm copper sulfate alone in the blue light produced a 0.954-log kill after 30 minutes, which is an 88.88% reduction. Thus the expected efficacy would be predicted as 85.208+88.88−(85.208*88.88)/100=98.355. A 98.355% reduction is only a 1.785-log kill. The actual efficacy was 7.73-log kill, which is 5.945-log greater than predicted by classical antimicrobial additive theory. The synergistic effect is responsible for nearly 6 orders of magnitude more bacteria kill.

The combination of 18 ppm riboflavin and 10 ppm copper sulfate has a dramatic synergistic effect of the reduction in the pathogen. It is one million times better than the additive effect. This is clearly unanticipated. Further combinations of antimicrobials and antibiotics could lead to either additive, synergistic or even possibly antagonistic interactions (Ocampo 2014, Bollenbach 2015). Thus, it is not obvious that the adding copper to riboflavin in a phototreating antimicrobial system would lead to a significantly improved result, let alone a result that is more than a million times better. The raw data are listed in the table found in FIG. 13.

Figure 14:
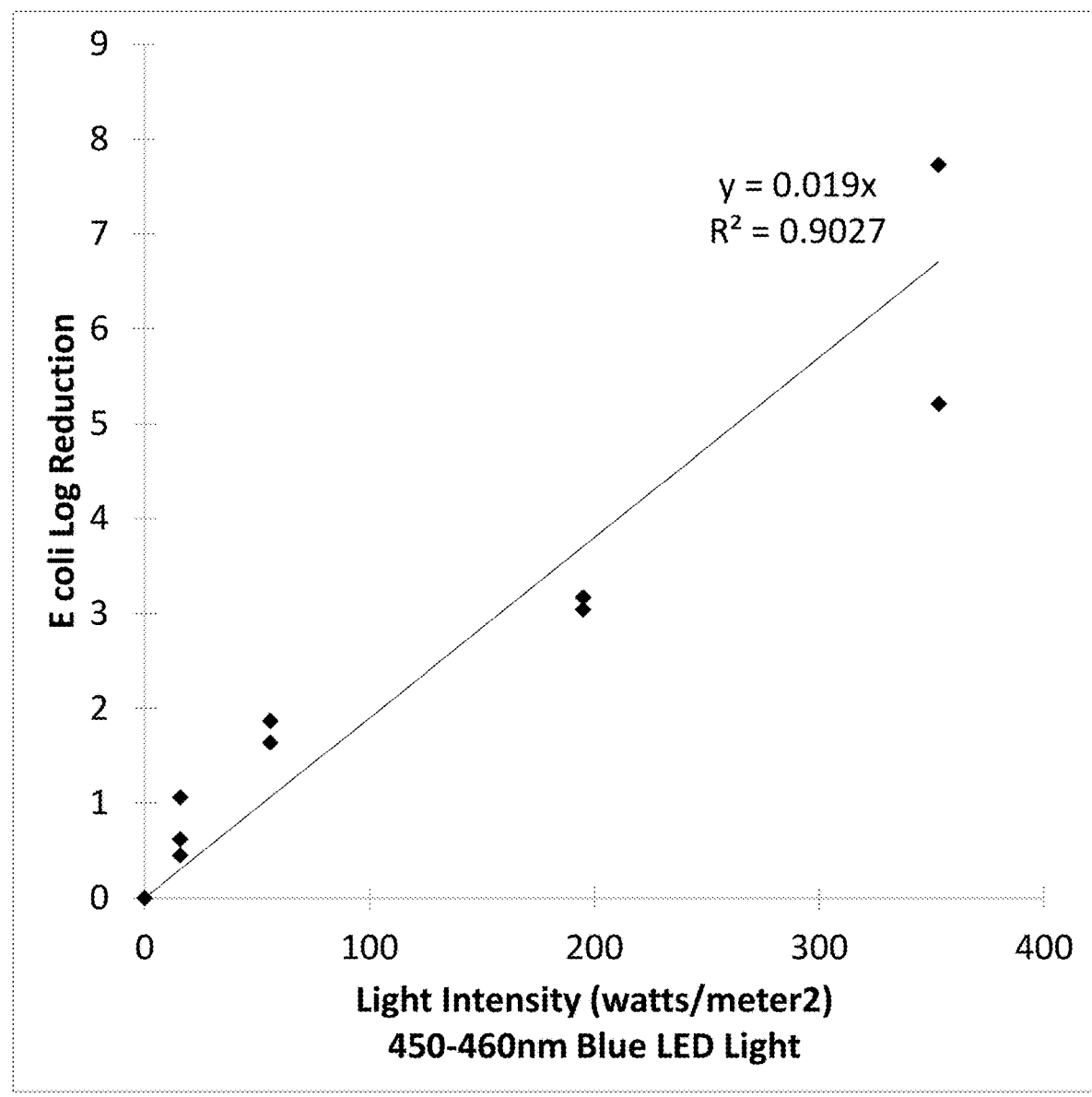
FIG. 14: *E. coli* Reduction after 15 min exposure

We also carried out tests to evaluate the effect of light intensity. These tests used 10 ppm copper sulfate and 18 ppm riboflavin (aqueous solution) in a 15-minute exposure under the blue light, using neutral density filters to decrease the light intensity. The full light intensity at the 450 nm to 460 nm range was 353 W/m$^2$. The results are shown in FIG. 14. At 16 W/m$^2$ (4.5% of full intensity) we observed a 0.71 log kill; at 56 W/m2 (15.9% of full intensity) we observed a 1.8 log kill; at 195 W/m$^2$ (55% of full intensity) we observed a 3.12 log kill; full intensity (353 W/m2, 100%) produced a 6.9 log kill. These results confirm that this is a photoactivated process because an increase in light intensity produces an increase in the desired effect.

It is important to recognize the difference between the concentration of copper sulfate used in Example 1 and the concentrations used in prior art for general-purpose pesticides. Bordeaux mixture (CuSO4 and Ca(OH)2) and Burgundy mixture (CuSO4 and Na2CO3) use copper sulfate at 1% or more (up to 20% for Burgundy mixture). In a preferred embodiment the present invention teaches using copper sulfate at a concentration of 10 ppm, which is a lower concentration by a factor of 1,000. The widely used copper-based pesticide CuPRO® 5000 (CuPRO® 2019) contains copper hydroxide. According to the label instructions, the recommended mixing rate with the lowest concentration of copper is 4 lbs of CuPRO® (2.45 lbs of copper hydroxide) per 100 gallons of water (834 lbs), which corresponds to a copper concentration of 0.030 M or 0.294%. That concertation is higher than the 10 ppm value used in the preferred formulation of the present invention by a factor of 294. Thus, comparing just the level of copper used in the present invention with the lowest concentration recommended by a widely used product, we use a lower concentration by a factor of almost 300. Multiple tests cited here used 10 ppm copper sulfate; higher concentrations (for example 100 ppm) may produce some antimicrobial activity in the absence of riboflavin due to the antimicrobial properties of the copper itself.

Example 2

Figure 15:
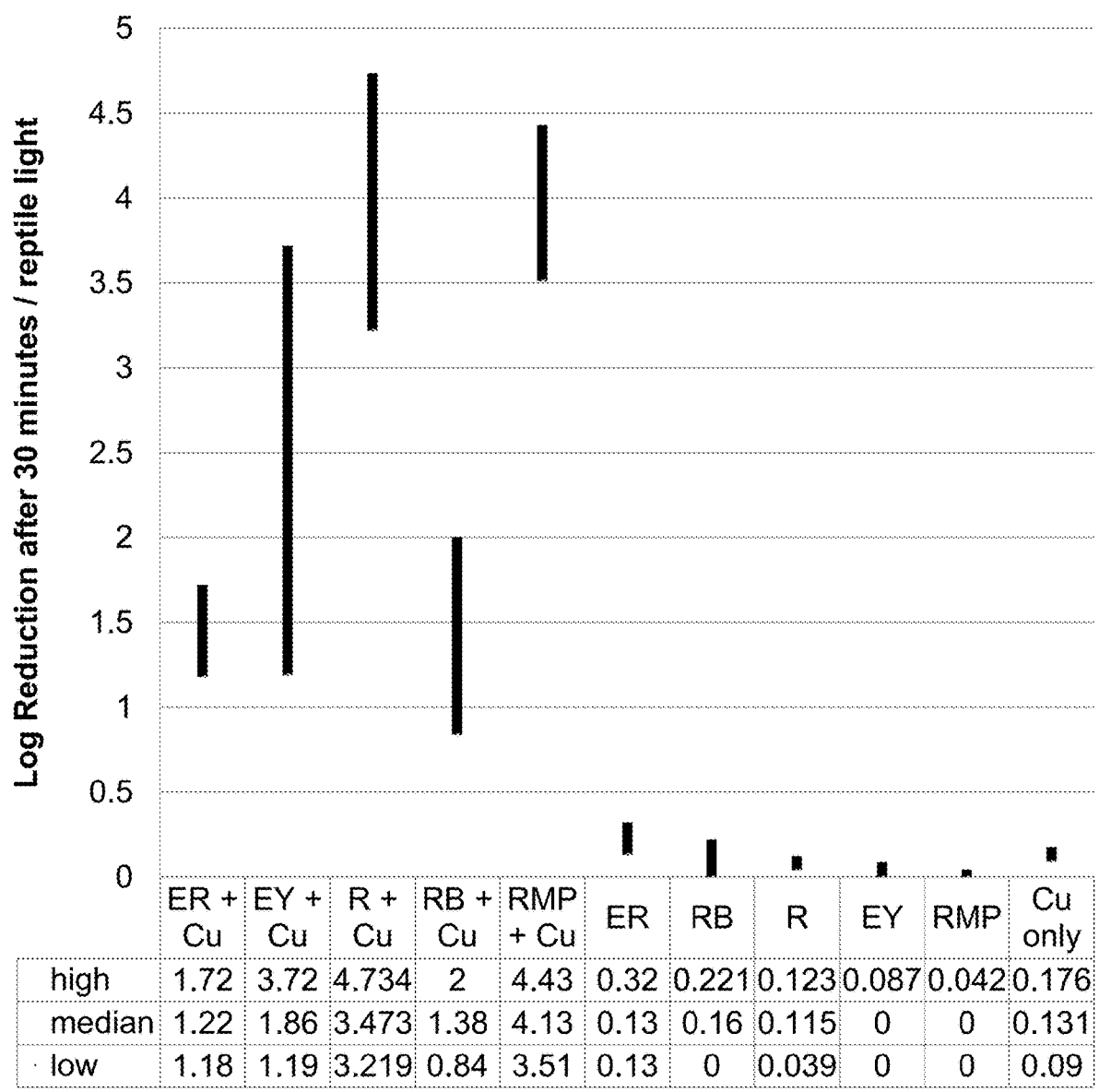
FIG. 15: Results from Example 2.

Synergistic *E. Coli* Kill Using Photosensitizers with Copper Salt and a Broad-Spectrum Light Source In this example we compare different photosensitizers (50 µM in water) in combination with and without copper sulfate. An agricultural adjuvant sticker spreader, Silwet® L-77 was also included at a 0.0125% concentration. The conditions experimental were the same as Example 1: *E. coli* as the test organism, using copper sulfate at 10 ppm, and a light exposure time of 30 minutes. However, in this test series we used a light source that reproduced the spectrum of sunlight, including UV. It is used to in terrariums for housing reptiles, some of which require a UV component in their light. It is referred to here as the Reptile Light (Zoo Med 2019). We tested riboflavin (R), erythrosine (ER), Rose Bengal (RB), Eosin Y (Y) and riboflavin monophosphate (RMP); with and without copper, results (average of 3 tests) are shown in FIG. 15. All of the dyes showed a synergistic kill effect, with riboflavin combined with copper producing the greatest unexpected synergistic log kill.

Using the median values for each test (see FIG. 15) it is apparent that the combinations of photosensitizers with copper leads to a synergistic effect. First, 10 ppm copper sulfate under the reptile lamp for 30 minutes only produces a 0.131-Log kill (26.04% kill) and the photosensitizers used alone are also not very effective: ER has a 0.13-Log kill (25.88% kill); RB has a 0.16-Log kill (30.81% kill); R has a 0.115-Log kill (23.26% kill); EY has an average 0.87-Log kill (6.46% kill); and RMP has an average 0.042-Log kill (3.17% kill).

Using the classical additive theory, the expected kill for the combination of 18 ppm ER and 10 ppm copper sulfate is 45.18% kill (0.261-Log kill). The actual median kill was 1.22-Log kill, which is 0.959-Log higher than expected, thus this is a synergistic effect.

Using the classical additive theory, the expected kill for the combination of 18 ppm EY and 10 ppm copper sulfate is 30.82% kill (0.160-Log kill). The actual median kill was 1.86-Log kill, which is 1.70-Log higher than expected, thus this is a synergistic effect.

Using the classical additive theory, the expected kill for the combination of 18 ppm R and 10 ppm copper sulfate is 43.24% kill (0.246-Log kill). The actual median kill was 3.473-Log kill, which is 3.23-Log higher than expected, thus this is a synergistic effect. This is also averaged 1,000 times more effective than expected from the additive theory.

Using the classical additive theory, the expected kill for the combination of 18 ppm RB and 10 ppm copper sulfate is 48.82% kill (0.159-Log kill). The actual median kill was 1.38-Log kill, which is 1.22-Log higher than expected, thus this is a synergistic effect.

Using the classical additive theory, the expected kill for the combination of 18 ppm RMP and 10 ppm copper sulfate is 28.38% kill (0.144-Log kill). The actual median kill was 4.13-Log kill, which is 3.98-Log higher than expected, thus this is a synergistic effect. This is almost 10,000 times more effective than expected.

Example 3

Additional Tests with Higher Photosensitizer Concentrations

In this example we also used the Reptile Light. In these tests the light intensity was 8,520 Lux, or 26 W/m2 (for comparison, this could be full daylight on a cloudy day, or a common light level in a greenhouse). We observed the following results: Riboflavin (10 ppm)+Silwet (0.0125%) for 30 minutes gave a log reduction of 0.15. Riboflavin at 50 ppm for 1 hour gave a log reduction of 1.6. Silwet (see Helena 2019) is an agricultural nonionic organosilicone surfactant adjuvant wetting and spreading agent commonly used with pesticides, also commonly known as a sticker spreader). Silwet® L-77 has minimal or no antimicrobial activity Copper sulfate (10 ppm)+Silwet (0.0125%) for 30 minutes gave a log reduction of 0.13. Copper sulfate at 40 ppm for 30 minutes also gave a log reduction of 0.13. Riboflavin (18 ppm)+copper sulfate (10 ppm)+Silwet (0.0125%) for 30 minutes gave a log reduction of 3.8. Again, we see an improvement of results in the combination of the photoactivator and copper by a factor of more than 1,000. This example shows that the combination of photoactivator and copper salt is highly effective under the most relevant conditions: common light levels, and the lowest effective concentration of both photoactivator and copper, which is desirable for economic reasons. In this example the light source includes UV light. However, as illustrated in the example using the blue LED, UV is not required.

Example 4

Copper Ethanolamine as Copper Compound

In this example we tested a commercial algicide product, Cutrine®, which contains copper ethanolamine (from the product label: Copper Ethanolamine Complex, Mixed (Mono CAS #14215-52-2 and Tri CAS #82027-59-6) 27.9%; OTHER INGREDIENTS 72.1% TOTAL 100.0% Metallic copper equivalent, 9%; Contains 0.909 lbs. of elemental copper per gallon) (EPA Reg. No. 8959-10). Copper ethanolamine is effective in keeping the copper salt in solution at neutral pH. The tests were done as above, under the reptile light for 30 minutes. From previous test data, under those conditions riboflavin alone produces well less than a 1-log kill.

The above tests using CuSO4 at 10 ppm is equivalent to 3.98 ppm copper. We initially tested Cutrine® at a low and a high concentration, where the low concentration is adjusted to have approximately 3.98 ppm copper as before, and the high concentration is 39.8 ppm copper (same copper concentration as 100 ppm CuSO4). We tested them with and without 18 ppm riboflavin. Again, tests were run in triplicate. Again, riboflavin alone at 18 ppm and under the reptile lamp for 30 minutes has a 0.115-Log kill (*E. coli*). Cutrine® at 3.98 ppm copper has a 0.30-Log kill and Cutrine® at 39.8 ppm has a 3.1-Log kill.

At 3.98 ppm copper the Cutrine® and 18 ppm riboflavin the combination has an observed 2.5-Log kill. The expected kill based on additive theory is only 0.314-Log kill. Thus, the actual kill is 2.18-Log higher than expected, and this is a synergistic effect.

At 39.8 ppm copper the Cutrine® and 18 ppm riboflavin the combination has an observed 7.4-Log kill (essentially complete kill). The expected kill based on additive theory is only 3.11-Log kill. Thus, the actual kill is 4.29-Log higher than expected, and this is clearly a synergistic effect.

Example 5

Reduction of *Xanthomonas Hortorum* pv. *Pelargonii* on Geranium Plants

In these tests, geranium cuttings 'American Bright Red' were obtained from Syngenta Flowers (Gilroy, CA). Cuttings were rooted and planted into 3.5" pots containing Joly Ranch Potting Mix #2. Plants were initially fertilized with 1.5 g/pot (Osmocote Plus, 15-9-12 with micronutrients) and were hand watered three times a week. Plants were allowed to establish and grow to approximately 15 cm in high. Experiment was done in a greenhouse house with temperatures maintained between 65-90° F. and light levels between 1000 to 2000 foot candles. Experiment was set-up in randomized block design with 3 blocks per treatment (10 plants per treatment, total number 60). A single product application was done on Feb. 27, 2019. A bactericide CuPro T/N/O 2005 (copper hydroxide, containing 35% metallic copper equivalent) was used at 2 lbs/100 gal (0.7 lbs metallic copper equivalent per 100 gallons) and applied as a standard control on the same date. All products were sprayed onto the surface of plants till run off using hand sprayers.

For production of bacterial inoculum, a culture of *Xanthomonas hortorum* pv. *pelargonii* (formerly *X. campestris* pv. *Pelargoni*, X575) was grown for 48 h at 28+/−1° C. on Difco Nutrient Agar (Difco Laboratories, Detroit, MI), amended with 5% sucrose. Bacteria were harvested from NA plates, suspended in saline (NaCl, 8.5 g/l) and adjusted spectrophotometrically at A600 to 1×105 colony forming units per ml. Leaves and stems were sprayed till run-off with bacterial suspensions and enclosed in clear polyethylene bags for 24 h. Treatments were inoculated 24 hours after bactericides were applied (Feb. 28, 2019). Noninoculated plants (sprayed with saline) were used as control in treatment 1. Numbers of leaf spots were counted on each plant two weeks after inoculation. Treatments were compared using ANOVA and LSD. Visual comparisons were also done to determine if there was any indication of phytotoxicity.

The data show that Treatment E, with riboflavin alone at 20 ppm, is only partially effective. However, Treatment C, with riboflavin at 20 ppm and copper sulfate at 10 ppm, is effective. Treatment D, which adds sodium ascorbate to riboflavin and copper sulfate, is as effective as the commercial product CuPRO. It is an advantage of our invention that it greatly decreases the amount of copper required. Comparing Treatment F, the commercial CuPRO product which contains 0.7 lbs metallic copper equivalent per 100 gallons, or 0.839 g copper per L, with Treatment D, which contains 10 ppm copper sulfate, or 0.00398 g copper per L, we see that the solution of the present invention provides an equivalent result while lowering the concentration of copper by a factor of more than 200. (See FIG. 16).

Although the present invention has been described in considerable detail with reference to certain preferred versions thereof, other versions are possible. Therefore, the spirit and scope of the appended claims should not be limited to the description of the preferred versions contained herein, except where required by Law.

The reader's attention is directed to all references which are filed concurrently with this specification and which are incorporated herein by reference.

All the features in this specification (including any accompanying claims, abstract, and drawings) may be replaced by alternative features serving the same, equivalent or similar purpose, unless expressly stated otherwise. Thus, unless expressly stated otherwise, each feature disclosed in one example only of a generic series of equivalent of similar features.

What is claimed is:

1. A method for synergistically inhibiting growth of a microbial pathogen of a plant, comprising:
   applying to the plant a combination comprising:
      a dye-bearing compound which is a reactive oxygen species photosensitizer, wherein the dye-bearing compound is provided at a concentration between about 1 and 100 ppm on a mass basis; and
      a copper compound to increase the microbial lethality of the dye-bearing compound towards the microbial pathogen, wherein the copper compound is provided at a concentration between about 3.98 and 39.8 ppm of copper on a mass basis; and exposing the plant to light to activate the combination of the dye-bearing compound and the copper compound and inhibiting growth of a microbial pathogen of a plant;

wherein the copper compound and the dye-bearing compound are provided in amounts that are synergistically effective to inhibit growth of the microbial pathogen.

2. The method of claim 1, wherein the copper compound is a copper salt, and wherein the copper salt and the dye-bearing compound are provided in amounts that are synergistically effective to inhibit growth of the microbial pathogen, wherein said combination increases microbial pathogen log kill by at least 1 order of magnitude, compared to the log kill that is expected based on an additive efficacy model, wherein the additive efficacy model determines the expected percent kill as calculated by the expression, P=X+Y(100−1)/100, wherein P is the expected percent kill of the pathogen using the combination of the reactive oxygen species photosensitizer and the copper salt, X is the percent kill of the pathogen when the reactive oxygen species photosensitizer is used alone, and Y is the percent kill of the pathogen when the copper salt is used alone.

3. The method of claim 2, wherein the dye-bearing compound is selected from the group consisting of a riboflavin, a derivatized riboflavin, a lumichrome, a derivatized lumichrome, a curcumin, a fluorescein, an eosin Y, an erythrosine, a flavin-containing compound and a rose bengal B.

4. The method of claim 3, wherein the dye-bearing compound is riboflavin.

5. The method of claim 1, wherein the copper compound is a copper salt selected from the group consisting of a copper (II) sulfate, a copper (II) nitrate, a copper hydroxide, a copper carbonate, a copper chloride, a copper oxide, and a copper bromide.

6. The method of claim 1, further comprising applying an ascorbate to the plant to increase the microbial lethality of said combination towards the microbial pathogen.

7. The method of claim 5, wherein the dye-bearing compound is provided at a concentration between about 5 and 50 ppm on a mass basis.

8. The method of claim 1, wherein exposing the plant to light comprises exposing the plant to natural light.

9. The method of claim 1, wherein exposing the plant to light comprises exposing the plant to artificial light.

10. The method of claim 1, wherein said combination is applied to the plant by at least one of soil drenching, pipetting, irrigation, spraying, listing, sprinkling, pouring.

11. The method of claim 1, wherein the microbial pathogen comprises either a bacterial pathogen, a cyanobacterial, an algal, a fungal pathogen, or a viral pathogen.

12. The method of claim 1, wherein the plant is a non-woody crop plant, a woody plant, a turfgrass, a fruit-bearing tree, a nut-bearing tree, or an ornamental plant.

13. The method of claim 1, wherein said combination further comprises at least one agriculturally acceptable adjuvant.

14. The method of claim 13, wherein the agriculturally acceptable adjuvant is selected from the group consisting of a surfactant, a penetrant, a wetting agent, a spreading agent, a humectant and an emulsifier.

15. The method of claim 1, wherein the copper compound is a copper salt, and wherein the dye-bearing compound and the copper salt are applied simultaneously to the plant.

16. The method of claim 1, wherein the copper compound is a copper salt, and wherein the dye-bearing compound and the copper salt are applied sequentially to the plant.

17. The method of claim 1, wherein the copper compound is a copper salt, and wherein the copper salt is used at a concentration below 39.8 ppm of copper on a mass basis to avoid unwanted damage to the plant or the environment.

18. The method of claim 1, wherein the copper compound is a copper salt, and wherein the dye-bearing compound and the copper salt are suitable for organic agricultural practices.

19. The method of claim 1, wherein the copper compound is a copper salt, and further comprising applying to the plant an ascorbic acid and a sodium bicarbonate to react with the copper salt to generate a reactive oxygen species.

20. The method of claim 2, further comprising applying to the plant an ascorbate salt to react with the copper salt to generate a reactive oxygen species.

21. The method of claim 1, wherein the dye-bearing compound which is a reactive oxygen species photosensitizer is selected from the group consisting of a riboflavin, a derivatized riboflavin, a lumichrome, a derivatized lumichrome, a curcumin, a fluorescein, an eosin Y, an erythrosine, and a rose bengal B; and wherein the copper compound is a copper ion-bearing organic complex to increase the microbial lethality of the dye-bearing compound towards the microbial pathogen.

22. The method of claim 21, wherein the copper ion-bearing organic complex is provided in an amount sufficient to increase microbial pathogen growth inhibition compared to the microbial pathogen growth inhibition of the reactive oxygen species photosensitizer alone.

23. The method of claim 22, wherein the copper ion-bearing organic complex and the dye-bearing compound are provided in amounts that are synergistically effective to inhibit growth of the microbial pathogen, wherein said combination increases microbial pathogen growth inhibition to an extent that is greater than the sum of the microbial pathogen growth inhibition of the reactive oxygen species photosensitizer and the copper ion-bearing organic complex when each is used alone.

24. The method of claim 22, wherein the copper ion-bearing organic complex and the dye-bearing compound are provided in amounts that are synergistically effective to inhibit growth of the microbial pathogen, wherein said combination increases microbial pathogen log kill by at least 1 log, or at least 1 order of magnitude, compared to the log kill that is expected based on an additive efficacy model, wherein the additive efficacy model determines the expected percent kill as calculated by the expression, P=X+Y(100−1)/100, wherein P is the expected percent kill of the pathogen using the combination of the reactive oxygen species photosensitizer and the copper ion-bearing organic complex, X is the percent kill of the pathogen when the reactive oxygen species photosensitizer is used alone, and Y is the percent kill of the pathogen when the copper ion-bearing organic complex used alone.

25. The method of claim 21, wherein the dye-bearing compound is riboflavin.

26. The method of claim 21, wherein the copper ion-bearing organic complex is selected from the group consisting of a copper ethanolamine, a copper EDTA, a copper ion complexed to a crown ether, and a copper ion complexed to polyethylene glycol.

27. The method of claim 21, wherein said combination further comprises at least one agriculturally acceptable adjuvant.

28. The method of claim 27, wherein the agriculturally acceptable adjuvant is selected from the group consisting of a surfactant, a penetrant, a wetting agent, a spreading agent, a humectant and an emulsifier.

29. The method of claim 21, wherein the dye-bearing compound and the copper ion-bearing organic complex are applied simultaneously to the plant.

30. The method of claim 21, wherein the dye-bearing compound and the copper ion-bearing organic complex are applied sequentially to the plant.

31. The method of claim 21, wherein the copper ion-bearing organic complex is used at a concentration below 100 ppm on a mass basis to avoid unwanted damage to the plant or the environment.

32. The method of claim 21, wherein the dye-bearing compound and the copper ion-bearing organic complex are suitable for organic agricultural practices.

33. The method of claim 24, further comprising applying to the plant an ascorbic acid and a sodium bicarbonate to react with the copper salt to generate a reactive oxygen species.

34. The method of claim 24, further comprising applying to the plant an ascorbate salt to react with the copper salt to generate a reactive oxygen species.

* * * * *

UNITED STATES PATENT AND TRADEMARK OFFICE
CERTIFICATE OF CORRECTION

| | |
|---|---|
| PATENT NO. | : 12,108,756 B2 |
| APPLICATION NO. | : 17/278657 |
| DATED | : October 8, 2024 |
| INVENTOR(S) | : Christopher Brian France and William Bell |

It is certified that error appears in the above-identified patent and that said Letters Patent is hereby corrected as shown below:

In the Specification

Column 2, Lines 50-51, the formula reading 'P=X+Y(100-1)/100'
Should read -- P=X+Y(100-X)/100 --.

Column 4, Line 9, the formula reading 'P=X+Y(100-1)/100'
Should read -- P=X+Y(100-X)/100 --.

In the Claims

Column 17, Lines 15-16, Claim 2, the formula reading 'P=X+Y(100-1)/100'
Should read -- P=X+Y(100-X)/100 --.

Column 18, Lines 46-47, Claim 24, the formula reading 'P=X+Y(100-1)/100'
Should read -- P=X+Y(100-X)/100 --.

Signed and Sealed this
Twelfth Day of November, 2024

Katherine Kelly Vidal
*Director of the United States Patent and Trademark Office*